(No Model.)
C. L. POLLEY.
DEVICE FOR FILING SAWS AND DRILLING.
No. 337,432. Patented Mar. 9, 1886.
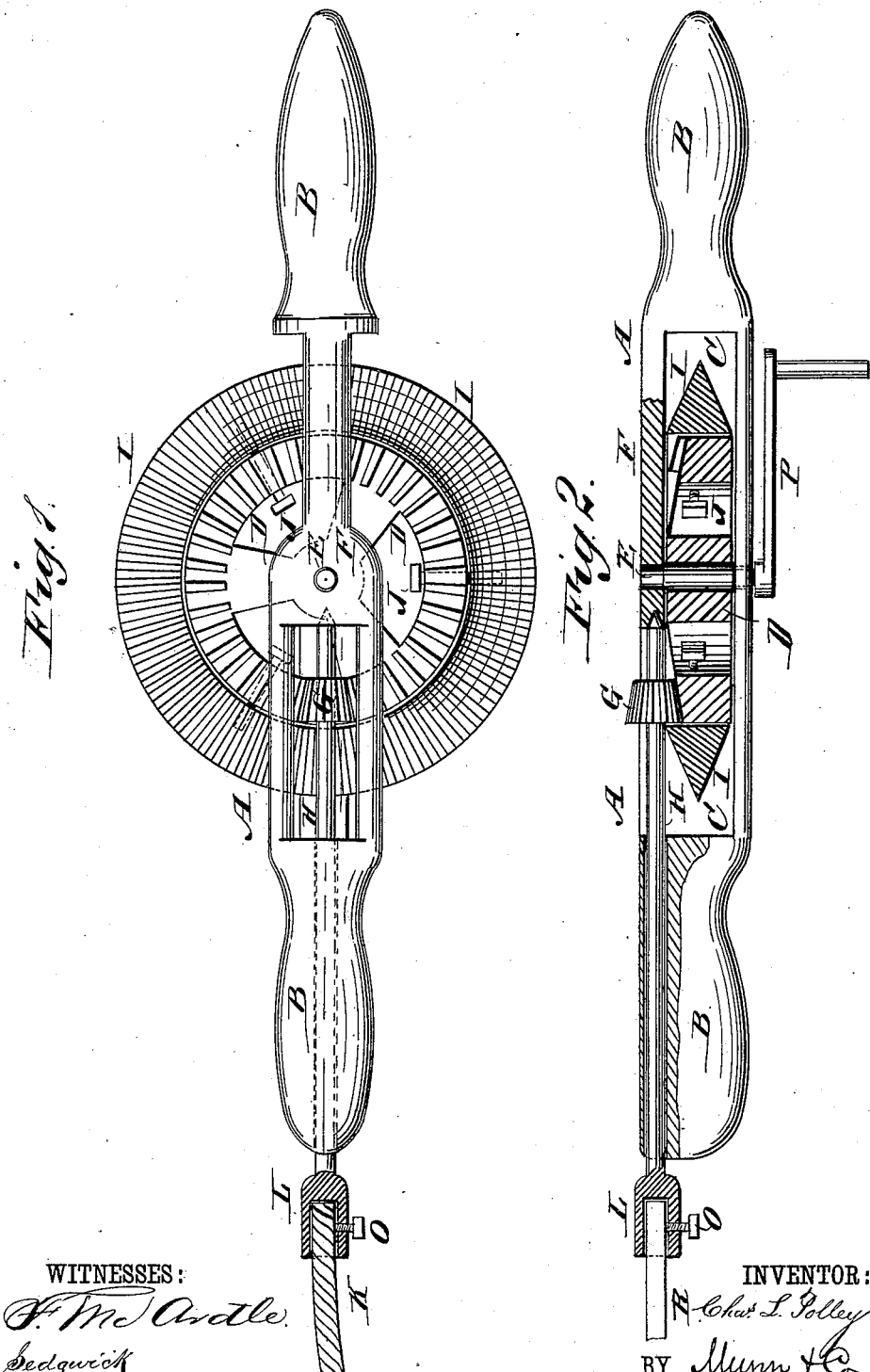
WITNESSES:
F. McArdle
C. Sedgwick
INVENTOR:
Chas. L. Polley
BY Munn & Co.
ATTORNEYS.

UNITED STATES PATENT OFFICE.

CHARLES L. POLLEY, OF SANDUSKY, OHIO.

DEVICE FOR FILING SAWS AND DRILLING.

SPECIFICATION forming part of Letters Patent No. 337,432, dated March 9, 1886.

Application filed July 2, 1885. Serial No. 170,484. (No model.)

*To all whom it may concern:*

Be it known that I, CHARLES L. POLLEY, of Sandusky, in the county of Erie and State of Ohio, have invented certain new and useful Improvements in Tools for Filing Saws and Drilling or Boring, of which the following is a full, clear, and exact description.

This invention relates to a hand-tool adapted to filing saws and drilling or boring holes; and it consists in a suitable frame with handles, and upon which is mounted the filing and drilling mechanism, to be driven either by power or by hand, as described; also, in an independent attachable and detachable circular file constructed substantially as described.

Reference is to be had to the accompanying drawings, forming part of this specification, in which similar letters of reference indicate corresponding parts in both the figures.

Figure 1 represents a side elevation of the tool arranged to be operated by power for filing saws; Fig. 2, a vertical central section of Fig. 1, arranged to be operated by hand for drilling or boring.

A in the accompanying drawings represents the frame of the tool, provided with two handles, B, one at either end thereof, by which to properly present and press the file between the teeth of the saw with the required force to sharpen them. In a slot, C, formed in the center of this frame A, is mounted a bevel cog-wheel, D, its bearings E resting in the cheeks F of the frame, as shown in sectional view, Fig. 2, and which is to be driven by a pinion, G, secured to a shaft, H, in one of the cheeks of the frame, and is to be operated by a flexible rope or shaft, hereinafter described.

To the periphery of the bevel cog-wheel D is fitted a circular file, I, the edge of which is V-shaped to fit between the teeth of the saw A to be filed, the same as an ordinary three-cornered file, in order to keep the teeth always of the same depth or length. This circular file I consists of a ring whose sides and edge form a V, and is detachably secured to the periphery of the bevel cog-wheel D by means of bolts J, as shown in Fig. 1, so that it may be detached and replaced by a new one when worn, or for any other reason. The two faces of the V are cut the same as an ordinary file, or in any other manner required.

In order to adapt this tool so that the circular file I thereof may be carried from one tooth to another without moving the saw, the shaft H of the pinion G is fitted with a flexible driving-rope or shaft, K, detachably secured to the end of the shaft H by a coupling, L, which driving-shaft extends to and is connected with the power in any convenient manner. This coupling L on the end of the pinion-shaft H serves also as a socket to receive and hold a drill or bit, R, and when it is desired to operate this tool by hand in drilling or boring the flexible rope or shaft K is disconnected from the coupling L, a drill or bit, R, inserted therein and retained by a thumb-screw, O, and a crank, P, is mounted upon the shaft of the bevel cog-wheel D, as shown in Fig. 2, which converts this tool into an ordinary drill-stock. The coupling L may be a socket, with a screw-thread therein, into which the flexible driving-shaft K is screwed, if preferred.

The circular file I may be secured to a separate driving-wheel from the bevel-wheel D, if desired, without departing from my invention, and which would simply be a modification of construction.

Having thus described my invention, what I claim as new, and desire to secure by Letters Patent, is—

1. A machine for filing saws, constructed substantially as shown and described, consisting of the frame, bevel-wheel, pinion, detachable file, and socket-shaft, which may be used as a means of attaching a driving-rope or to receive any tool, such as a drill or an auger, as set forth.

2. A machine for filing saws, constructed substantially as shown and described, consisting of the frame, bevel-wheel, pinion, detachable file, and socket-shaft, in combination with a crank for operating the same, as set forth.

CHAS. L. POLLEY.

Witnesses:
FRANK P. COLVER,
THOMAS L. WILLIAMS.